H. H. STOUT.
LEACHING TANK.
APPLICATION FILED MAR. 8, 1915.
1,169,205.
Patented Jan. 25, 1916.
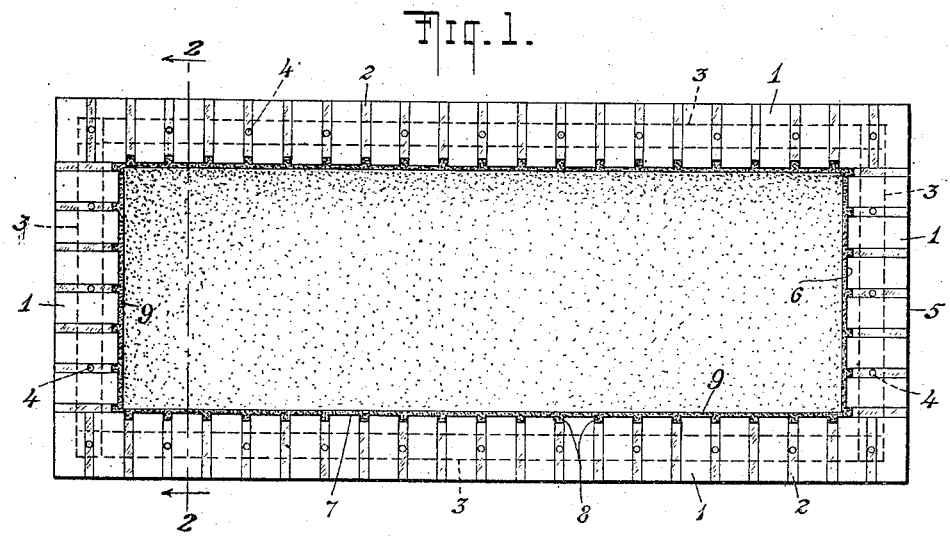
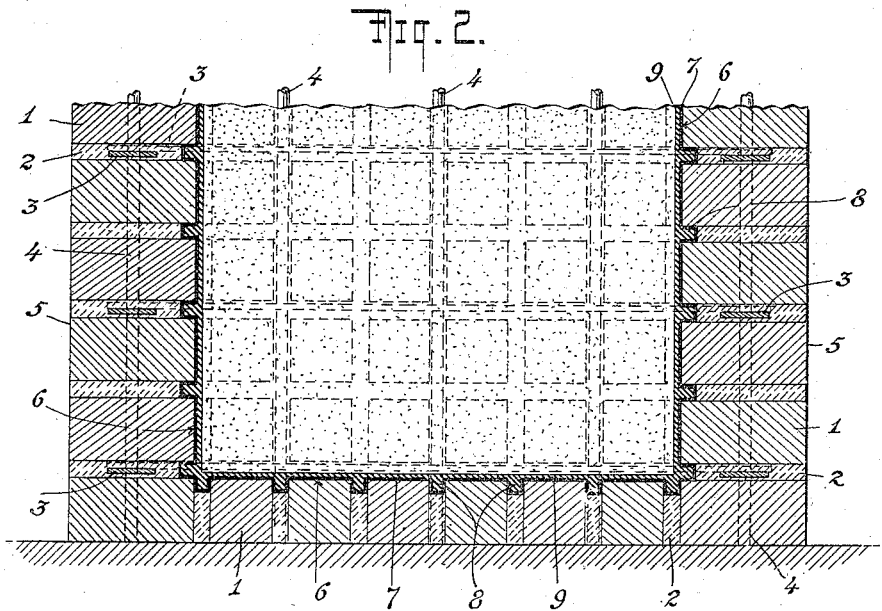
WITNESSES
G. V. Rasmussen
John A. Ferguson
INVENTOR
HARRY H. STOUT
BY
ATTORNEYS

UNITED STATES PATENT OFFICE.

HARRY H. STOUT, OF NEW YORK, N. Y., ASSIGNOR TO NICHOLS COPPER COMPANY, OF NEW YORK, N. Y., A CORPORATION OF NEW YORK.

LEACHING-TANK.

1,169,205.

Specification of Letters Patent.

Patented Jan. 25, 1916.

Application filed March 8, 1915. Serial No. 12,829.

*To all whom it may concern:*

Be it known that I, HARRY H. STOUT, a citizen of the United States, and a resident of the borough of Manhattan, city, county, and State of New York, have invented certain new and useful Improvements in Leaching-Tanks, of which the following is a specification.

My invention relates to tanks for holding corrosive chemical solutions such as acid solutions and more particularly to leaching or electrolytic tanks adapted for employment in the treatment of copper.

The object of my invention, generally speaking, is to provide a tank which will have sufficient mechanical strength to withstand indefinitely the wear and tear of use and will hold without being attacked thereby corrosive liquors or solutions, such as those which are employed in the chemical industries.

My invention has special utility in connection with the electrolytic treatment of copper and it will now be described with reference to such use although it is to be understood that my invention embraces tanks of a variety of constructions and adapted for a variety of uses. Electrolytic tanks adapted for copper treatment have heretofore generally been made of wood, with iron stays, but such tanks have to be repaired or replaced frequently because in practice they cannot be made liquid-tight and because the iron stays become attacked and disintegrated. Concrete tanks have been proposed, but concrete is attacked by the solutions ordinarily used in industrial chemical processes and such tanks, even when provided with asphalt linings, are of no permanent value because the linings are necessarily thin and are frequently broken through.

The present invention contemplates a tank of novel construction such as will obviate the disadvantages of the tanks of the types above referred to and will be serviceable for various uses, an example of such construction being shown in the accompanying drawings in which—

Figure 1 is a plan view of the tank and Fig. 2 is an enlarged cross-sectional view of a portion of the tank on the line 2—2 of Fig. 1.

The tank shown is rectangular in form and is composed of walls and bottom of acid resisting bricks, such as ordinary paving bricks. The individual bricks 1 are bound together in separated relation by a suitable binding means 2, such as cement mortar. For strengthening purposes any suitable metal reinforcements may be employed, such as the horizontal iron plates 3 and the vertical rods 4, the latter passing through suitable apertures in the former and both the rods and the plates being embedded in the mortar 2. If the construction is such that the vertical joints are broken, the rods may be bent so as to conform to the joints. If these joints are not broken, the rods will be straight, as shown; in the latter case, the courses of bricks will preferably be spaced so as to be separated by a distance less than the thickness of the copper anode plates employed in connection with the tank. This provision is made so that the plates cannot strike accidentally between the bricks so as to exert a blow upon the separating mortar.

The mortar may extend flush with the exterior wall surfaces 5 of the tank but is recessed as to the interior wall surfaces 6 both of the side and end walls and of the bottom wall. A priming material 7 is now applied to the mortar surfaces within the recesses 8 and preferably also to the other surfaces of the recesses and to the inner brick surfaces 6. This priming material has for its principal function to cause adherence between the wall surfaces and the coating subsequently to be applied; it may also be resistant to acid and other solutions in which case it will serve as a protecting means and need not be covered by the second coating. The priming material is preferably an organic substance dissolved in a medium substantially all of which will evaporate after application; examples of this material are collodion, asphalt and gasolene, asphalt and kerosene, and asphalt and carbon tetra chlorid.

It is preferable to coat the priming material with a second or body coating of a chemically resistant material by which I mean such as will not be affected by the liquid in the tank. This resistant material 9 is applied on top of the priming material so as to protect the binding means in the recesses 8 above mentioned; preferably it will be so applied as to entirely fill the recesses 8 and to cover also the brick surfaces 6.

The body coating is usually applied hot by a trowel or by a swab and should be of such thickness that there will be not less than a half inch of it between the bottom walls of the recesses and the exposed surface of the coating.

A suitable resistant material may be composed of or may contain a bituminous or asphaltic material. For copper electrolyzing tanks a material of this kind should preferably have a melting point below 300° F. and should be viscous enough so as not to flow from position at or below 135° F., this temperature being substantially that of the solution of copper sulfate and sulfuric acid during the electrolyzing process. An example of such material is the "asphaltum" of commerce.

The priming coating is employed, as stated above, primarily to cause the body coating to adhere to the cement or bricks; it also serves to fill the pores of the cement and of the bricks also if the glaze of the bricks is porous or if unglazed porous bricks are used.

It will be seen that when a tank so constructed is used for electrolytic or other purposes, the cement mortar or other binding material is protected from attack by the corrosive tank contents, such as the sulfuric acid and copper sulfate electrolyte. Moreover, if the protective coating is subjected to blows, as often happens in copper electrolysis especially when the heavy anodes are being introduced into or removed from the tank, such blows cannot remove the coating held in the recesses and cannot result in a condition which will permit of the corrosive solution coming into contact with the binder. It is possible that such wear and tear may remove the coating from the brick faces 6, in case the body coating has been applied thereto, but such removal will have no deleterious effect for the reason that the bricks themselves are practically resistant against action by acid solutions or the like. The asphaltic resistant material at the temperature of electrolysis of copper is of a tough and plastic rather than of a hard and brittle nature and for this reason it will not chip off but will yield somewhat to blows and will tend thereafter to regain its original position. The portions in the recesses serve as anchorages so that it will be possible to apply a thick coating without danger of its flowing out of place.

I claim:

1. A tank comprising walls of bricks, means for binding said bricks together in spaced relation, said binding means extending to a point at a distance from the inner faces of the bricks whereby recesses are formed on the inner surfaces of the walls and a chemically resistant material in said recesses and protecting the surfaces of the binding means therein.

2. A tank comprising walls of bricks, means for binding said bricks together in spaced relation, said binding means extending to a point at a distance from the inner faces of the bricks whereby recesses are formed on the inner surfaces of the walls and a chemically resistant material covering said inner surfaces of the walls and filling said recesses.

3. A tank comprising walls of bricks, means for binding said bricks together in spaced relation, said binding means extending to a point at a distance from the inner faces of the bricks whereby recesses are formed on the inner surfaces of the walls, a priming material in said recesses and in contact with the surfaces of the binding means therein and a chemically resistant material covering said priming material.

4. A tank comprising walls of bricks, means for binding said bricks together in spaced relation, said binding means extending to a point at a distance from the inner faces of the bricks whereby recesses are formed on the inner surfaces of the walls, a priming material in contact with the inner brick faces and the surfaces of said recesses and a chemically resistant material covering said priming material.

5. A tank comprising walls of acid resistant bricks, means for binding said bricks together in spaced relation, said binding means extending to a point at a distance from the inner faces of the bricks whereby recesses are formed on the inner surfaces of the walls, a priming material in contact with the inner brick faces and the surfaces of said recesses and an acid resistant material entirely covering said priming material and filling said recesses.

In testimony whereof I have hereunto set my hand in the presence of two subscribing witnesses.

HARRY H. STOUT.

Witnesses:
JOHN A. FERGUSON,
FRANK F. KIRKPATRICK.